United States Patent [19]

Naruse et al.

[11] Patent Number: 5,237,837
[45] Date of Patent: Aug. 24, 1993

[54] ICE MAKING MACHINE

[75] Inventors: Nobutaka Naruse, Toyoake; Yoshinori Kamitani, Konan, both of Japan

[73] Assignee: Hoshizaki Denki Kabushiki Kaisha, Aichi, Japan

[21] Appl. No.: 740,573

[22] Filed: Aug. 6, 1991

[30] Foreign Application Priority Data

Aug. 6, 1990 [JP] Japan .................................. 2-208844

[51] Int. Cl.$^5$ .............................. F25C 1/00; F25C 1/12
[52] U.S. Cl. .................................... 62/434; 62/347; 62/303
[58] Field of Search ............... 62/66, 135, 340, 347, 62/349, 303

[56] References Cited

U.S. PATENT DOCUMENTS

| 3,638,448 | 2/1972 | Raymer | 62/303 X |
| 4,555,913 | 12/1985 | Ishiguro | 62/347 |
| 4,577,473 | 3/1986 | Ishiguro | 62/347 |
| 4,601,176 | 7/1986 | Suyama | 62/347 X |
| 4,601,178 | 7/1986 | Suyama et al. | 62/347 |
| 4,617,806 | 10/1986 | Sakai et al. | 62/347 |
| 4,791,792 | 12/1988 | Naruse et al. | 62/347 X |
| 4,903,505 | 2/1990 | Sakai et al. | 62/347 |
| 4,934,159 | 6/1990 | Sakai et al. | 62/347 |

FOREIGN PATENT DOCUMENTS 0118375 5/1990 Japan ..................................... 62/66

Primary Examiner—Henry A. Bennet
Assistant Examiner—Christopher Kilner
Attorney, Agent, or Firm—Nikaido, Marmelstein, Murray & Oram

[57] ABSTRACT

In an ice making machine the ice forming unit of which includes an upright ice forming plate located above a water tank and having a cooling surface in heat exchange relationship with an evaporator attached thereto and an ice forming surface to be supplied with water from the water tank by means of a water pump for forming the water into ice cubes, a first water supply conduit is connected to the water pump to supply the water from the water tank toward the ice forming surface of the upright plate when an ice making mode or a washing mode is selected at the ice making machine, and a second water supply conduit is arranged to introduce a portion of the water supplied from the water tank into a space above the evaporator only when the washing mode is selected at the ice making machine.

4 Claims, 7 Drawing Sheets

5,237,837

ICE MAKING MACHINE

BACKGROUND OF THE INVENTION

1. Field of the Invention

The present invention relates to ice making machines, more particularly to an ice making machine in which the ice forming unit includes an upright ice forming plate located above a water tank and having a cooling surface in a heat exchange relationship with an evaporator attached thereto and an ice forming surface to be supplied with water from the water tank by means of a water pump for forming the water into ice cubes.

2. Description of the Prior Art

In conventional ice making machines disclosed, for example, in Japanese Utility Model Publication No. 59-39571, Japanese Patent Early Publication No. 2-93266 and U.S. Pat. No. 4,341,087, the evaporator is arranged to be supplied with hot gas through a hot gas valve in the refrigeration system for defrost of the ice cubes formed on the ice forming plate. In conventional ice making machines disclosed, for example, in Japanese Utility Model Publication No. 57-49107 and U.S. Pat. No. 3,074,252, the evaporator is arranged to be exposed with fresh water supplied from a water supply pipe for defrost of the ice cubes formed on the ice forming plate. In conventional ice making machines disclosed, for example, in Japanese Patent Early Publication No. 62-210367, Japanese Patent Publication No. 64-7307 and U.S. Pat. No. 3,465,537, the evaporator is arranged to be supplied with hot gas through a hot gas valve in the refrigeration system and exposed with fresh water supplied from a water supply pipe for defrost of the ice cubes formed on the ice forming plate.

In such conventional ice making machines as described above, the water from the water tank is circulated by the water pump to be supplied to the ice forming surface of the upright plate. When an amount of detergents is put into the water tank, the ice forming surface of the upright plate can be washed by the detergent water supplied thereto from the water tank in operation of the water pump. In this instance, however, the evaporator on the opposite surface of the upright plate may not be washed by the detergent water circulated by the water pump.

SUMMARY OF THE INVENTION

It is, therefore, a primary object of the present invention to provide an improved ice making machine wherein the evaporator can be washed by the detergent water circulated by the water pump for washing the ice forming surface of the upright plate.

According to the present invention, the primary object is accomplished by providing an ice making machine, the ice forming unit of which includes an upright ice forming plate located above a water tank and having a cooling surface in heat exchange relationship with an evaporator attached thereto and an ice forming surface to be supplied with water from the water tank by means of a water pump for forming the water into ice cubes, wherein the ice making machine comprises a device for selecting an ice making mode or a washing mode at the ice making machine, a first water supply conduit connected to the water pump to supply the water from the water tank toward the ice forming surface of the upright plate when the ice making mode or the washing mode is selected at the ice making machine, and a second water supply conduit arranged to introduce a portion of the water supplied from the water tank into a space above the evaporator only when the washing mode is selected at the ice making machine.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
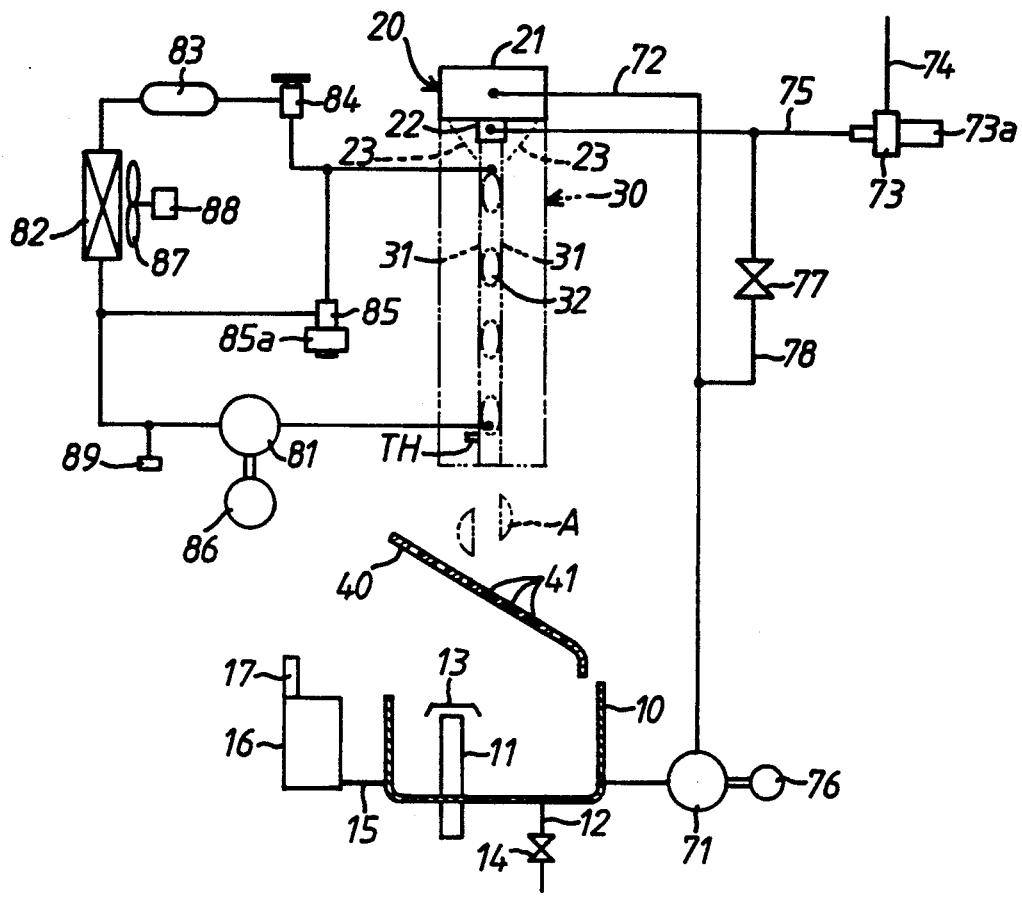
FIG. 1 is a schematic illustration of a water supply system and a refrigeration system in an ice making machine.

In FIG. 1 of the drawings, there is schematically illustrated an ice making machine of the flow-down type which includes a water tank 10 arranged to store an amount of fresh water to be formed into ice cubes, a spray assembly 20, an ice forming unit 30 arranged above the water tank 10, and a perforated guide plate 40 arranged at an inclined angle under the ice forming unit 30 to receive ice cubes A falling from the ice forming unit 30 and introduce them into an ice storage bin (not shown). The guide plate 40 is formed with a number of holes 41 through which the water falling from the ice forming unit 30 flows down into the water tank 10. The water tank 10 is provided therein with an overflow pipe 11 for defining a maximum level of water. Arranged above the overflow pipe 11 is a cover member 13 which is formed to prevent the flow of water falling into the overflow piper 11 from the holes 41 of guide plate 40. A drain pipe 12 is connected to the bottom of water tank 10 and provided with a normally closed drain valve 14. A sub-tank 16 is connected to the water tank 10 by means of a connecting pipe 15.

Figure 2:
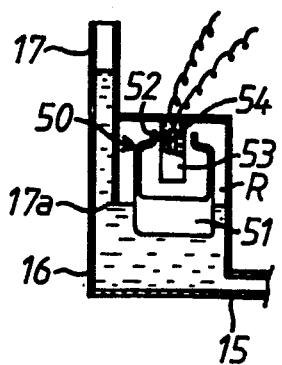
FIG. 2 is an enlarged sectional view of a sub-tank shown in FIG. 1.
Figure 7:
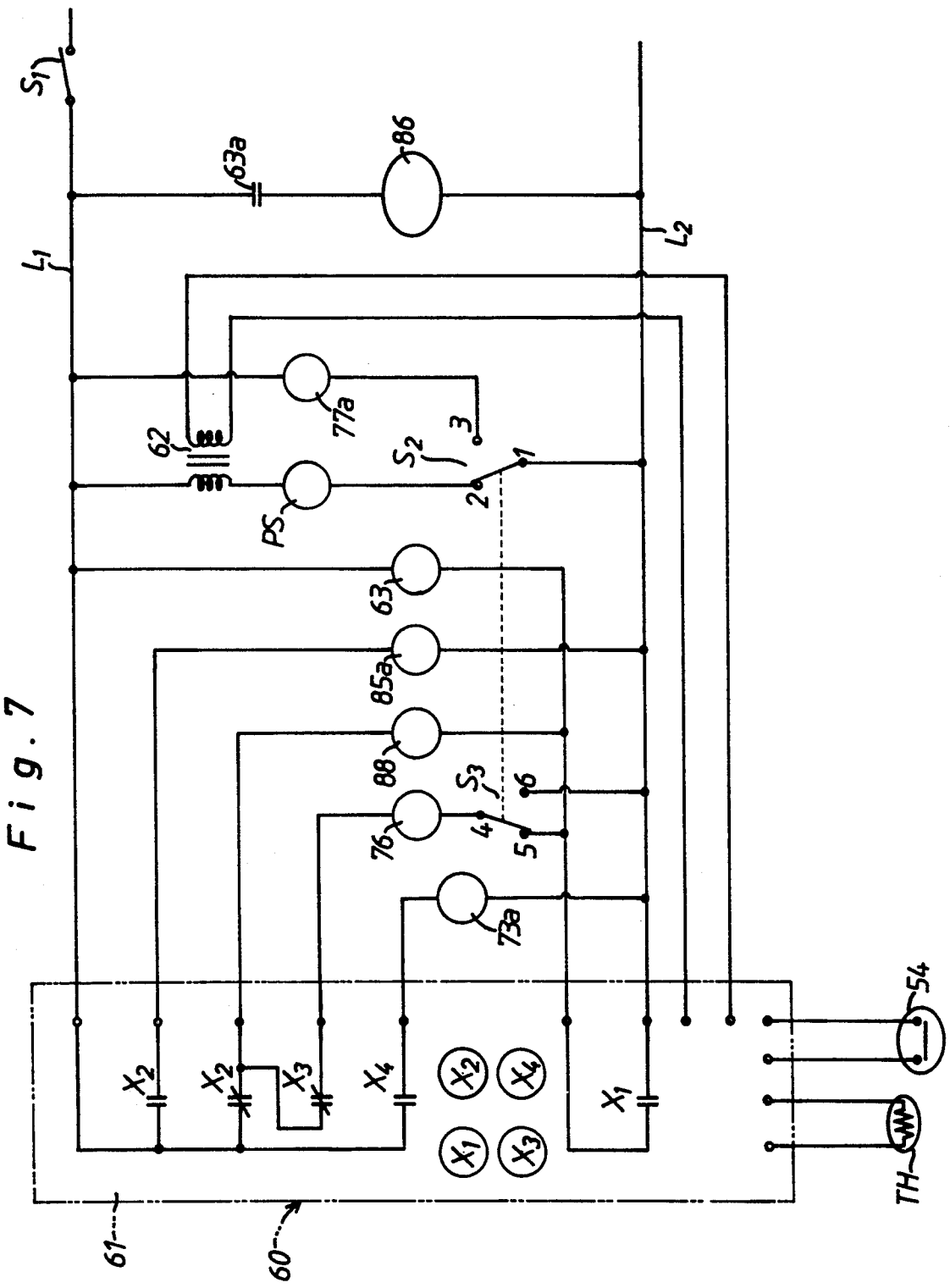
FIG. 7 is a circuit diagram of an electric control apparatus for the water supply system and the refrigeration system shown in FIG. 1.

As shown in FIG. 2, the sub-tank 16 is provided with a vent pipe 17 extending downward in a predetermined distance and with a liquid surface detection device 50. When the level of water in water tank 10 rises above the lower end 17a of vent pipe 17, a closed chamber R is formed in the sub-tank 16. The liquid surface detection device 50 includes a float 51 arranged to be displaced upward or downward in accordance with change of the liquid surface in sub-tank 16, a permanent magnet 52 mounted on an upper end opening portion of float 51, a cylindrical bottomed guide tube 53 attached to an upper wall of sub-tank 16 to guide up and down movements of the float 51, and a normally open reed switch 54 disposed within the guide tube 53 to be operated by approach of the magnet 52 thereto. As shown in FIG. 7, the reed switch 54 is connected to an electric control apparatus 60 for a water supply system of the ice forming unit 30. When the liquid surface in sub-tank 16 drops below a predetermined level, the reed switch 54 is closed by the magnet 52 to apply an electric signal indicative of completion of the ice making operation to the electric control apparatus 60.

Figure 3:
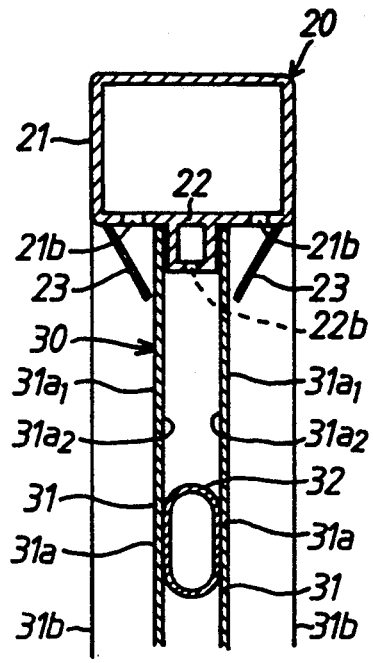
FIG. 3 is an enlarged sectional view of a spray assembly mounted on the upper portion of an ice forming unit in the ice making machine.
Figure 4:
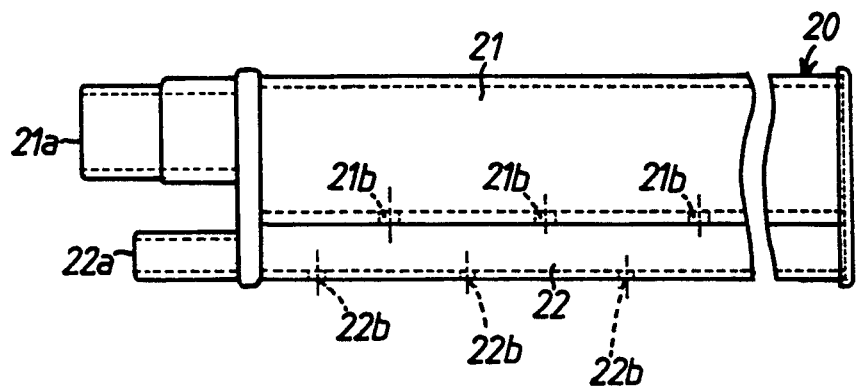
FIG. 4 is a side view of the spray assembly shown in FIG. 3.
Figure 5:
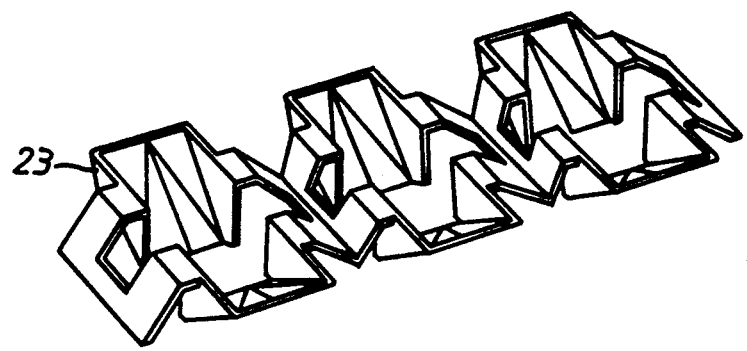
FIG. 5 is an enlarged perspective view of a spray guide member shown in FIG. 3.

As shown in FIGS. 1, 3 and 4, the spray assembly 20 includes a large size ice making spray casing 21 of rectangular in cross-section and a small size defrost spray casing 22 of rectangular in cross-section integrally formed with a central portion of spray casing 22. As shown in FIGS. 3 and 5, the spray assembly 20 is integrally mounted together with a spray guide member 23 on the upper end of ice forming unit 30. The ice making spray casing 21 has an end wall formed with an inlet port 21a and a bottom wall formed at its both sides with a number of spray holes 21b spaced in a predetermined distance. As shown in FIG. 1, the inlet port 21a of spray casing 20 is connected to one end of a water supply conduit 72 the other end of which is connected to the water tank 10 through a water pump 71. The defrost spray casing 22 is provided at its one end with an inlet port 22a and formed at its bottom with a number of spray holes 22b spaced in a predetermined distance and displaced in a half pitch with respect to the spray holes 21b. As shown in FIG. 1, the inlet port 22a is connected to one end of a water supply conduit 75 the other end of which is connected to a water service pipe 74 through an electrically operated water valve 73. The water pump 71 is arranged to be driven by an electric motor 76, and the water valve 73 is operated by energization of its solenoid 73a. As shown in FIG. 7, the electric motor 76 and the solenoid 73a of water valve 73 are connected to the electric control apparatus 60.

As shown in FIG. 1, the water supply conduits 72 and 75 respectively for ice making spray casing 21 and defrost spray casing 22 are connected to one another by means of a bypass conduit 78 provided thereon with an electrically operated bypass valve 77. As shown in FIG. 7, the solenoid 77a of bypass valve 77 is connected to the electric control apparatus 60. When the bypass valve 77 is opened by energization of its solenoid 77a, a portion of the water supplied from the water tank 10 in operation of the water pump 71 is introduced to the evaporator 32 in the ice forming unit 30 through the bypass conduit 78 and circulated into the water tank 10 through the ice forming unit 30.

Figure 6:
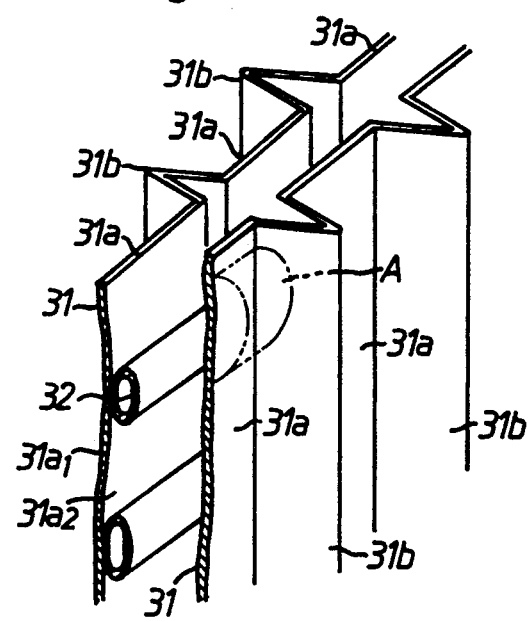
FIG. 6 is an enlarged perspective view illustrating the upper portion of the ice forming unit shown in FIG. 3.

As shown in FIGS. 1, 3 and 6, the ice forming unit 30 is composed of a set of upright ice forming plates 31, 31 mounted on a framework (not shown) of the ice making machine and the evaporator 32 disposed between the ice forming plates 31, 31. The upright ice forming plates 31 each are formed with a plurality of laterally equally spaced flat ice forming portions 31a and a plurality of V-letter shaped partition walls 31b located between the flat ice forming portions 31a. The spray guide member 23 shown in FIG. 5 is disposed between the upper ends of ice forming plates 31, 31 in such a manner that the water falling from the spray holes 21b of ice making spray casing 21 is introduced onto each ice forming surface $31a_1$ of flat ice forming portions 31a. The evaporator 32 is in the form of a pipe of ellipse in cross-section which is bent at a plurality of vertically spaced portions and welded to the opposed cooling surfaces $31a_2$ of flat ice forming portions 31a. In the ice forming unit 30, a plurality of vertical spaces are formed between the evaporator 32 and the partition walls 31b of upright plates 31.

As shown in FIG. 1, the evaporator 32 is connected at its outlet to a compressor 81 in connection to a condenser 82 and at its inlet to an expansion valve 84 connected to the condenser 82 through a drier 83. A hot gas valve 85 is disposed within a bypass conduit connecting the upstream of condenser 82 to the downstream of expansion valve 84. The compressor 81 is arranged to be driven by an electric motor 86, and a cooling fan 87 for the condenser 82 is arranged to be driven by an electric motor 88. The hot gas valve 85 is normally closed to be opened by energization of its solenoid 85a at a defront cycle. A pressure switch PS shown in FIG. 7 is arranged to be opened when the discharge pressure of compressor 81 exceeds a predetermined value, and a thermister TH is arranged to detect the outlet temperature of evaporator 32. As shown in FIG. 7, the electric motors 86, 88, the solenoid 85a of hot gas valve 85, the pressure switch PS and the thermister TH are connected to the electric control apparatus 60.

As shown in FIG. 7, the electric control apparatus 60 includes a control base plate 61 provided with relays $X_1$, $X_2$, $X_3$, $X_4$ and a microcomputer (not shown) and connected to common power source lines $L_1$, $L_2$ of a commercially available electric power source, a power transformer 62 for control base plate 61, a magnetic switch 63 for control of the power supply to the electric motor 86 of compressor 81, a manual switch $S_1$ provided on the common power source line $L_1$, a first changeover switch $S_2$ provided on a power supply circuit of the transformer 62 and pressure switch PS, and a second changeover switch $S_3$ provided on a power supply circuit of the electric motor 76 for the water pump 71. The changeover switches $S_2$, $S_3$ are interlocked when operated by a user as follows. When the changeover switch $S_2$ is operated to establish a connection between contacts 1 and 2 for selecting an ice making mode at the electric control apparatus 60, the changeover switch $S_3$ is operated to establish a connection between contacts 4 and 5. When the changeover switch $S_2$ is operated to establish a connection between contacts 1 and 3 for selecting a washing mode at the electric control apparatus 60, the changeover switch $S_3$ is operated to establish a connection between 4 and 6.

Assuming that the ice making mode has been selected at the electric control apparatus 60, the first changeover switch $S_2$ is conditioned to establish the connection between contacts 1 and 2, while the second changeover switch $S_3$ is conditioned to establish the connection between contacts 4 and 5. Under such a condition, the solenoid 77a of bypass valve 77 is maintained in a deenergized condition, and the relays $X_1$ to $X_4$ on control base plate 61 are operated under control of the microcomputer to effect the following operation. When the manual switch $S_1$ is closed by the user, the solenoid 73a of water valve 73 is energized for a predetermined time. Thus, the water valve 73 is opened to supply fresh water from the water service pipe 74 into the defrost spray casing 22 through the water supply conduit 75. The water supplied into the defrost sprinkler casing 22 falls into vertical spaces between the upright ice forming plates 31 and evaporator 32 and flows into the water tank 10 through the holes 41 of guide plate 40. Simultaneously, the electric motor 86 is energized to drive the compressor 81 for circulating the refrigerant in the refrigeration system, and the solenoid 85a is energized for the predetermined time to open the hot gas valve 85. As a result, a predetermined amount of the water is stored in the water tank 10, and the evaporator 32 is defrosted by hot gas supplied thereto from the compressor 81 through the hot gas valve 85.

After lapse of the predetermined time, the power supply to the solenoids 73a and 85a are interrupted to close the water valve 73 and hot gas valve 85, while the electric motors 76 and 88 are energized to drive the water pump 71 and to rotate the cooling fan 87 of condenser 82. Thus, the refrigerant in the refrigeration system is circulated into the evaporator 32 after expanded by the expansion valve 84, and the evaporator 32 is chilled by evaporation of the refrigerant. On the other hand, the water pump 71 is driven by the electric motor 76 to supply the water from the water tank 10 into the ice making spray casing 21 through the water supply conduit 72. The water supplied into the ice making spray casing 21 falls along the ice forming surfaces $31a_1$ of upright plates 31 and is circulated into the water tank 10 through the holes 41 of guide plate 40. The water falling along the ice forming surfaces $31a_1$ of upright plates 31 is gradually chilled by thermal exchange with the refrigerant in evaporator 32 and formed into ice cubes A of semicircular in cross-section as shown by imaginary lines in FIG. 6. When the ice cubes A are formed in a desired size on the ice forming surfaces $31a_1$ of upright plates 31, the float 51 in subtank 16 drops to the minimum level, and in turn, the reed switch 54 is operated by the permanent magnet 52 to produce an electric signal indicative of completion of the ice making.

When the control base plate 61 of the electric control apparatus 60 is applied with the electric signal from reed switch 54, the electric motors 76 and 88 are deenergized to stop the water pump 71 and cooling fan 87, while the solenoids 73a and 85a are energized to open the water valve 73 and hot gas valve 85 for effecting a defrost cycle at the ice making machine. Thus, the evaporator 32 is supplied with the hot gas from compressor 81 through the hot gas valve 85, while the defrost spray casing 22 is supplied with fresh water from the water service pipe 74 through the water valve 73 and conduit 75. The fresh water supplied into the defrost spray casing 22 falls into the vertical spaces between the evaporator 32 and upright ice forming plates 31 and flows into the water tank 10 through the holes 41 of guide plate 40. As a result, the ice cubes A are melted by the hot gas and fresh water at their contact surfaces with the ice forming surfaces $31a_1$ of upright plates 31. When the level of fresh water supplied into the water tank 10 from the water service pipe 74 reaches the upper end of overflow pipe 11, the ice cubes A are completely melted at their contact surfaces with the ice forming surfaces $31a_1$ of upright plates 31 and separated therefrom. The ice cubes falling from the ice forming upright plates 31 are received by the guide plate 40 and introduced into the storage bin (not shown). In this instance, the thermister TH cooperates with a timer in a defrost detection device (not shown) to produce an electric signal indicative of completion of the defrost cycle. For example, the electric signal indicative of completion of the defrost cycle is produced when two minutes have been measured by the timer after nine centigrade was detected by the thermister TH. When the control base plate 61 of the electric control apparatus 60 is applied with the electric signal from the defrost detection device, the solenoids 73a, 85a are deenergized to close the water valve 73 and hot gas valve 85, while the electric motors 76, 88 are energized to drive the water pump 71 and to rotate the cooling fan 87. Thus, the ice making cycle is restarted for repeatedly making a desired amount of ice cubes.

When it is desired to sanitate the ice making machine, an amount of washing detergent or sterilizer is put into the water previously stored in the water tank 10 after the ice making machine has been stopped. In this instance, the first changeover switch $S_2$ is switched over to establish a connection between contacts 1 and 3, while the second changeover switch $S_3$ is switched over to establish a connection between contacts 4 and 6. Thus, the control base plate 61 is disconnected from the power transformer 62, and the relays $X_1$ to $X_4$ on control base plate 61 are maintained as shown in FIG. 7 to deactivate the refrigeration system in the ice making machine. When the manual switch $S_1$ is closed by the user under the condition described above, the solenoid 77a is energized to open the bypass valve 77, and the electric motor 76 is energized to drive the water pump 71. In this condition, the ice making spray casing 21 is supplied with the washing water from the water tank 10 through the water supply conduit 72, while the defrost spray casing 22 is supplied with the washing water from the water tank 10 through the bypass conduit 78 and water supply conduit 75. The washing water supplied into the ice making spray casing 21 falls along the ice forming surfaces $31a_1$ of upright plates 31 and flows into the water tank 10 through the holes 41 of guide plate 40. On the other hand, the washing water supplied into the defrost spray casing 22 falls into the vertical spaces between the evaporator 32 and upright plates 31 and flows into the water tank 10 through the holes 41 of guide plate 40. As a result, the respective interior of water tank 10 and spray casings 21, 22, the respective opposite surfaces of upright plates 31, the outer surface of evaporator 32 and the guide plate 40 are simultaneously washed in a simple and reliable manner to maintain the ice making machine in a sanitary condition.

After washing, the drain valve 14 is opened to discharge the washing water through the drain pipe 12. Subsequently, the solenoid 73a is energized to open the water valve 73 thereby to supply fresh water into the water tank 10 through the defrost spray casing 21, the vertical spaces between the evaporator 32 and upright plates 31 and the holes 41 of guide plate 40. The fresh water is circulated by operation of the water pump 71 in the manner described above to rinse the respective interior of water tank 10 and spray casings 21, 22, the respective opposite surfaces of upright plates 31, the outer surface of evaporator 32 and the guide plate 40. When the ice making mode is selected at the electric control apparatus 60 after sufficient rinsing, the first changeover switch $S_2$ is switched over to establish the connection between contacts 1 and 2, while the second changeover switch $S_3$ is switched over to establish the connection between contacts 4 and 5. Thus, the solenoid 77a is deenergized to close the bypass valve 77, and the control base plate 61 is connected to the power transformer 62 to operate the relays $X_1$ to $X_4$ under control of the computer for effecting the ice making operation described above.

Figure 8:
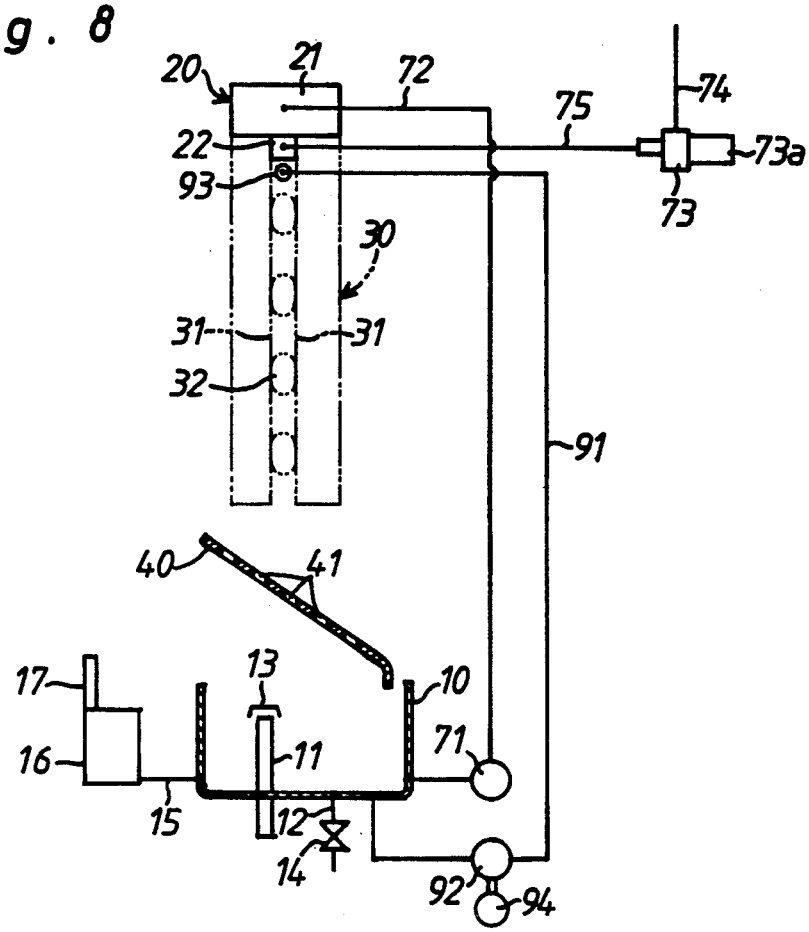
FIG. 8 is a schematic illustration of a modification of the water supply system shown in FIG. 1.
Figure 9:
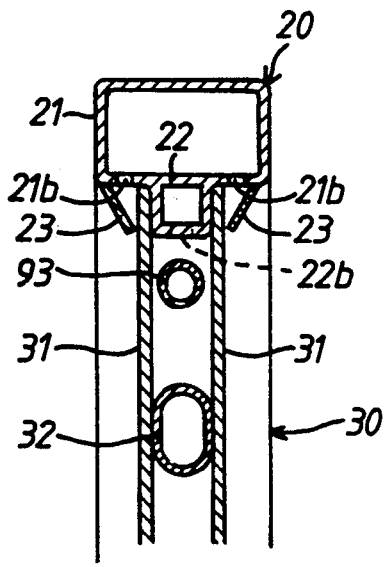
FIG. 9 is an enlarged sectional view a spray assembly mounted on the upper portion of the ice forming unit shown in FIG. 8.
Figure 10:
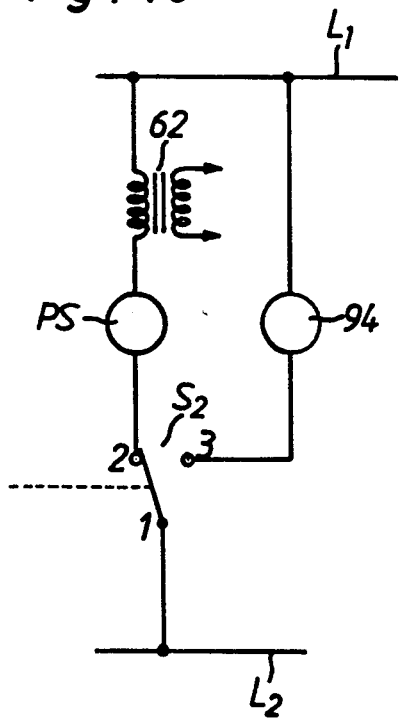
FIG. 10 is a circuit diagram of a modification of the electric control apparatus for the water supply system shown in FIG. 8.

In FIGS. 8 and 9 there is schematically illustrated a modification of the ice making machine shown in FIG. 1, wherein a water pump 92 is further connected to the water tank 10 to supply the washing water therefrom to a washing spray pipe 93 through a conduit 91. The spray pipe 93 is arranged above the evaporator 32 to supply the washing water into the vertical spaces between the evaporator 32 and upright plates 31. In the electric control apparatus 60, an electric motor 94 of the water pump 92 is substituted for the solenoid 77a of bypass valve 77 as shown in FIG. 10. In this modification, the supply amount of washing water into the spray pipe 93 can be independently increased by operation of the water pump 92 to shorten the washing time of the ice making machine.

Figure 11:
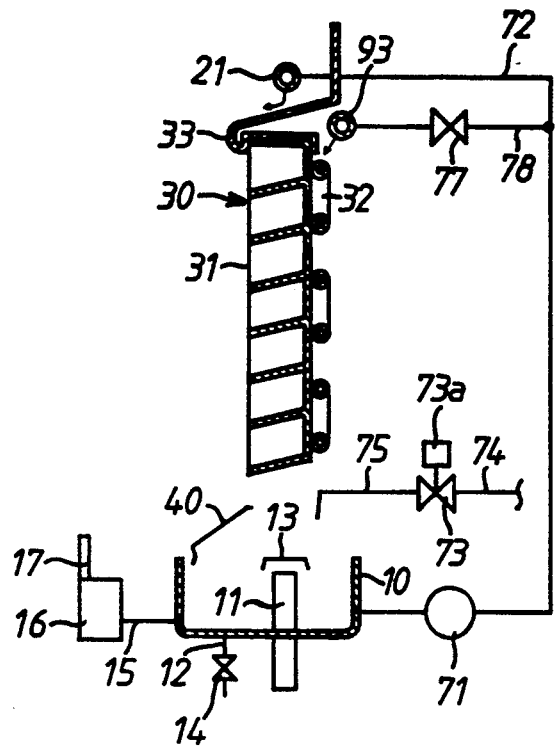
FIG. 11 is a schematic illustration of another modification of the water supply system shown in FIG. 1.

In FIG. 11 there is schematically illustrated another modification of the ice making machine shown in FIG. 1, wherein a single upright ice forming plate 31 is substituted for the upright ice forming plates. In this modification, the evaporator 32 is attached to the rear surface of ice forming plate 31 to be supplied with the washing water from a spray pipe 93 in the washing mode, and a spray guide 33 is arranged to introduce fresh or washing water into the upright ice forming plate 31 from a spray pipe 21. The spray pipe 93 is connected to the water supply conduit 72 through the bypass conduit 78, and the water supply conduit 75 is arranged to directly supply fresh water into the water tank 10 from the water service pipe 74 through the water valve 73.

Figure 16:
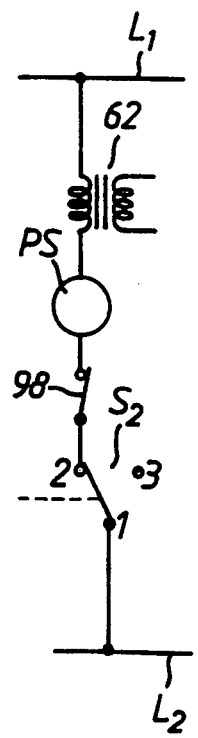
FIG. 16 is a circuit diagram of another modification of the electric control apparatus shown in FIG. 7.
Figure 12:
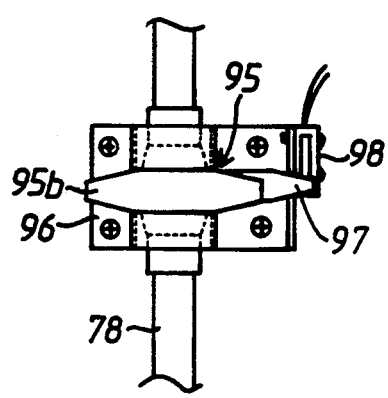
FIG. 12 is an elevational view of a manual selector valve substituted for a bypass valve shown in FIG. 1.
Figure 13:
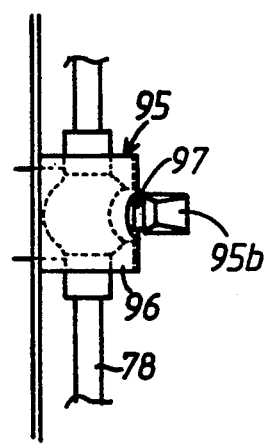
FIG. 13 is a side view of the selector valve shown in FIG. 12.
Figure 14:
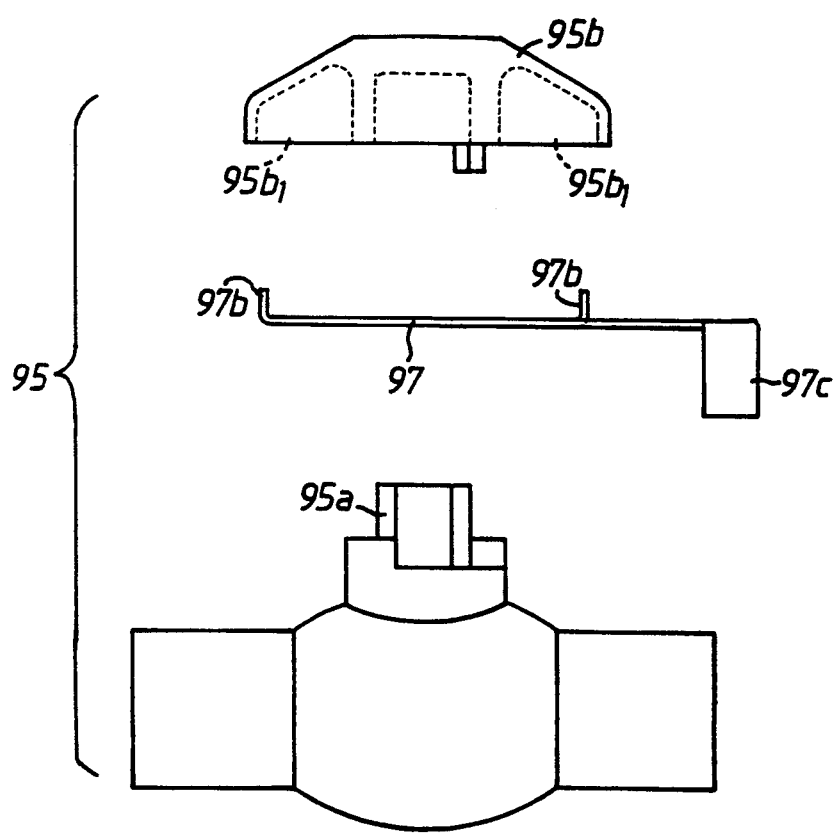
FIG. 14 is a plan view showing disassembled parts of the selector valve.
Figure 15:
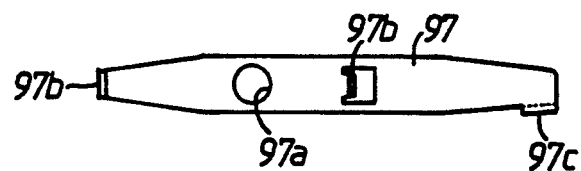
FIG. 15 is a front view of a rotary lever shown in FIG. 14.

Although in the ice making machine shown in FIG. 1, the electrically operated bypass valve 77 has been adapted to supply the washing water into the defrost spray casing 22 in the washing mode, the bypass valve 77 may be replaced with a manual selector valve 95 shown in FIGS. 12 and 13. The selector valve 95 is mounted at its bracket 96 to the framework of the ice making machine to be opened when a manual handle 95b is rotated to be positioned in the same direction as the bypass conduit 78 and to be closed when the manual handle 95b is returned to the original position shown in FIG. 12. As shown in FIG. 14, the manual handle 95b is coupled with an operation shaft 95a of selector valve 95 for rotation therewith. In the selector valve 95, a rotary lever 97 is integrally assembled with the manual handle 95b to open and close a normally closed switch 98 mounted to the bracket 96. As shown in FIG. 15, the rotary lever 97 is formed with a pair of bent portions 97b and a lug 97c for engagement with the normally closed switch 98. The rotary lever 97 is coupled with the operation shaft 95a at its mounting hole 97a and engaged with recesses $95b_1$ of the manual handle 95b at its bent portions 97b. As shown in FIG. 16, the normally closed switch 98 is connected in series with the first changeover switch $S_2$ in a power supply circuit of the power transformer 62 to deactivate the operation of the refrigeration system when the selector valve 95 has been opened in the washing mode of the ice making machine.

What is claimed is:

1. An ice making machine the ice forming unit of which includes an upright ice forming plate located above a water tank and having a cooling surface in heat exchange relationship with an evaporator attached thereto and an ice forming surface to be supplied with water from the water tank by means of a water pump for forming the water into ice cubes, the ice making machine comprising:

selecting means for selecting one of an ice making mode and a washing mode wherein, an amount of washing detergent or sterilizer is added to the water in the water tank prior to said washing mode;

a first water supply conduit connected to said water pump to supply the water from said water tank toward the ice forming surface of said upright plate when both the ice making mode and the washing mode are selected by the selecting means; and a second water supply conduit arranged to introduce a portion of the water supplied from said water tank into a space above said evaporator only when the washing mode is selected by the selecting means when a compressor of the ice making machine is deactivated.

2. An ice making machine the ice forming unit of which includes an upright ice forming plate located above a water tank and having a cooling surface in heat exchange relationship with an evaporator attached thereto and an ice forming surface to be supplied with water from the water tank by means of a water pump for forming the water into ice cubes, the ice making machine comprising:

selecting means for selecting one of an ice making mode and a washing mode wherein, an amount of washing detergent or sterilizer is added to the water in the water tank prior to said washing mode;

a first water supply conduit connected to said water pump to supply the water from said water tank toward the ice forming surface of said upright plate when both the ice making mode and the washing mode are selected by the selecting means; and a second water supply conduit arranged to introduce a portion of the water supplied from said water tank into a space above said evaporator only when the washing mode is selected by the selecting means when a compressor of the ice making machine is deactivated, wherein said second water supply conduit is a bypass conduit bifurcated from said first water supply conduit and being provided thereon with a normally closed bypass valve to be opened only when the washing mode is selected at the ice making machine.

3. An ice making machine as claimed in claim 2, wherein said water tank is arranged to receive the water falling from said ice forming unit, and wherein a third water supply conduit is provided to introduce fresh water from a source of water therethrough into the space above said evaporator when the ice making mode is selected at the ice making machine and is connected to said bypass conduit to introduce the water from said water tank therethrough into the space above said evaporator when the washing mode is selected at the ice making machine.

4. An ice making machine the ice forming unit of which includes an upright ice forming plate located above a water tank and having a cooling surface in heat exchange relationship with an evaporator attached thereto and an ice forming surface to be supplied with water from the water tank by means of a water pump for forming the water into ice cubes, the ice making machine comprising:

selecting means for selecting one of an ice making mode and a washing mode wherein, an amount of washing detergent or sterilizer is added to the water in the water tank prior to said washing mode;

a first water supply conduit connected to said water pump to supply the water from said water tank toward the ice forming surface of said upright plate when both the ice making mode and the washing mode are selected by the selecting means; and a second water supply conduit arranged to introduce a portion of the water supplied from said water tank into a space above said evaporator only when the washing mode is selected by the selecting means when a compressor of the ice making machine is deactivated, wherein said second water supply conduit is connected to said water tank independently from said first water supply conduit and provided with an additional water pump for supplying the water from said water tank into the space above said evaporator therethrough.

* * * * *